United States Patent
Tian et al.

(10) Patent No.: US 12,376,610 B2
(45) Date of Patent: Aug. 5, 2025

(54) PREPARATION METHOD OF RICE NOODLE WITH LOW GLYCEMIC INDEX

(71) Applicant: Jiangnan University, Wuxi (CN)

(72) Inventors: Yaoqi Tian, Wuxi (CN); Jinling Zhan, Wuxi (CN); Yunyun Wang, Wuxi (CN); Canxin Cai, Wuxi (CN); Rongrong Ma, Wuxi (CN); Zhengyu Jin, Wuxi (CN)

(73) Assignee: Jiangnan University, Wuxi (CN)

( * ) Notice: Subject to any disclaimer, the term of this patent is extended or adjusted under 35 U.S.C. 154(b) by 1416 days.

(21) Appl. No.: 16/933,210

(22) Filed: Jul. 20, 2020

(65) Prior Publication Data

US 2020/0345046 A1  Nov. 5, 2020

Related U.S. Application Data

(63) Continuation of application No. PCT/CN2019/114521, filed on Oct. 31, 2019.

(30) Foreign Application Priority Data

Jul. 30, 2019  (CN) .......................... 201910694155.2

(51) Int. Cl.
*A23L 7/104* (2016.01)
*A23L 7/10* (2016.01)
(Continued)

(52) U.S. Cl.
CPC ............. *A23L 7/107* (2016.08); *A23L 7/1975* (2016.08); *A23L 29/06* (2016.08); *A23L 29/10* (2016.08); *A23P 30/25* (2016.08); *A23L 7/109* (2016.08)

(58) Field of Classification Search
CPC ........ A23L 7/107; A23L 7/1975; A23L 29/06; A23L 29/10; A23L 7/109; A23L 7/113; A23L 33/10; A23P 30/25; A23P 30/20
See application file for complete search history.

(56) References Cited

FOREIGN PATENT DOCUMENTS

CN  203723334 U  *  1/2014
CN  105685807 A  *  6/2016
(Continued)

OTHER PUBLICATIONS

Raigond, P., Dutt, S., Singh, B. (2017). Resistant Starch in Food. In: Merillon, JM., Ramawat, K. (eds) Bioactive Molecules in Food. Reference Series in Phytochemistry. Springer, Cham. (Year: 2017).*
(Continued)

*Primary Examiner* — Michele L Jacobson
(74) *Attorney, Agent, or Firm* — IPRO, PLLC; Na Xu

(57) ABSTRACT

The disclosure discloses a preparation method of rice noodles with low glycemic index, and belongs to the technical filed of food processing. According to the disclosure, by adding debranching enzymes and an emulsifying agent into rice starch, resistant starch is prepared and obtained through one-step extrusion, and then, other food raw materials are compounded to form the low glycemic index rice noodles through secondary extrusion. By using the characteristic that V-type crystals are formed by complexing the emulsifying agent and amylose, the disclosure adds the debranching enzymes and the emulsifying agent into a rice starch raw material for extrusion processing. The debranching enzymes added in a first-step extrusion processing process perform limited hydrolysis on starch to reduce starch branching and improve a content of the amylose. At the same time, the emulsifying agent and the highly straight-chain rice starch are complexed to generate a VI-type starch-lipid complex, and a complexing rate is obviously improved. Then, second-step extrusion processing is performed to realize transformation of the starch-lipid complex from VI-type crystals to VII-type crystals and extrusion forming. Thermal stability of the resistant starch is improved. Therefore, the low glycemic index rice noodles are prepared and obtained.

13 Claims, 1 Drawing Sheet

(51) Int. Cl.
    *A23L 7/109*     (2016.01)
    *A23L 29/00*     (2016.01)
    *A23L 29/10*     (2016.01)
    *A23P 30/25*     (2016.01)

(56) References Cited

FOREIGN PATENT DOCUMENTS

| | | | |
|---|---|---|---|
| CN | 107373326 A | 11/2017 | |
| CN | 109588695 A | 4/2019 | |
| CN | 110250414 A | 9/2019 | |
| JP | 2005192457 A * | 7/2005 | |
| WO | WO-2017099131 A1 * | 6/2017 | ............. A23L 7/109 |

OTHER PUBLICATIONS

Kim M, et al, "Particle size effect of rice flour in a rice-zein noodle system for gluten-free noodles slit from sheeted doughs," Journal of Cereal Science 86 (Jan. 2019) 48-53 (Year: 2019).*

Wang JP, et al, "Emulsifiers and thickeners on extrusion-cooked instant rice product," J Food Sci Technol (Jul.-Aug. 2013) 50(4):655-666 (Year: 2013).*

Italian Food Tech, "Drying of pasta," Apr. 6, 2013, retrieved Oct. 21, 2023 from the internet, <https://www.italianfoodtech.com/drying-of-pasta/> (Year: 2013).*

The Seattle Times, "Making fresh pasta is easier than you think," May 18, 2015, retrieved Oct. 21, 2023 from the internet, <https://www.seattletimes.com/life/food-drink/making-fresh-pasta-is-easier-than-you-think/> (Year: 2015).*

Kip, Messy Vegan Cook, "Freshly Steamed Homemade Rice Noodles (Sen Yai)," May 17, 2017, retrieved Oct. 30, 2023, <https://www.messyvegancook.com/homemade-rice-noodles-recipe-sen-yai/> (Year: 2017).*

Ciriminna R, e.t al., "Citric acid: emerging applications of key biotechnology industrial product," Chemistry Central Journal (2017) 11:22 (Year: 2017).*

EGForums, eGullet, "Cooking fresh rice noodles" post by sheetz on Feb. 26, 2011, pp. 13-14, https://forums.egullet.org/topic/30737-cooking-fresh-rice-noodles/ (Year: 2011).*

PCT/CN2019/114521 ISA210 ISR Mail Date Apr. 16, 2020.

* cited by examiner

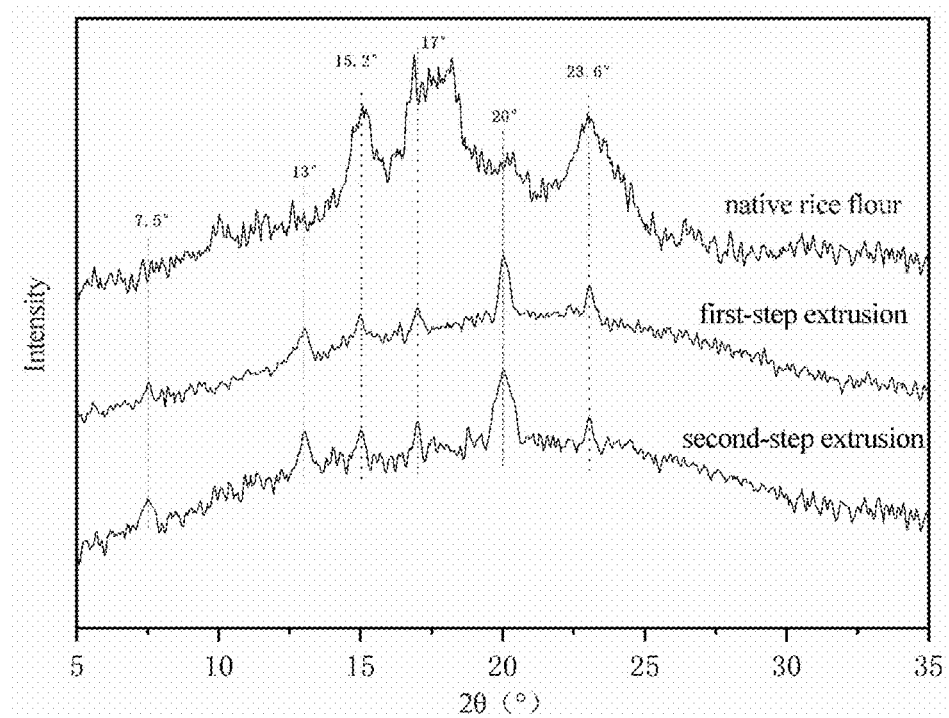

PREPARATION METHOD OF RICE NOODLE WITH LOW GLYCEMIC INDEX

TECHNICAL FIELD

The disclosure herein relates to a preparation method of rice noodle with low glycemic index, and belongs to the technical field of food processing.

BACKGROUND

In recent ten years, the number of diabetic patients worldwide has increased rapidly at a surprising rate. Through statistics according to data in 2010, the total number of diabetic patients in China reached 116000000, accounting for 11.6% of the total population. China has become a country with the largest population of diabetic patients in the world. Prevention and treatment of the diabetic patients have also become one of main public health problems.

Postprandial hyperglycemia is a main factor of aggravating diabetes and causing complications. Therefore, controlling the postprandial blood glucose is an effective measure to prevent the diabetes. The choice and control of diet, especially staple foods (i.e., carbohydrates) by the diabetic patients are the basis for the treatment of diabetes, and are related to the long-term control of blood glucose and the occurrence and development of chronic complications of the diabetic patients. Therefore, selecting the staple foods with a low glycemic index is a focus of diet therapy of the diabetes. Starch is the most important source of carbohydrates and a main energy source for people, and plays an irreplaceable role in the daily life of people. A large number of studies have demonstrated that resistant starch has a low glycemic index (GI), and plays an important role in aspects of controlling postprandial blood glucose and insulin levels, improving insulin resistance, reducing the pressure of a blood glucose homeostasis regulation and control system, and preventing and treating various diet-related chronic diseases.

Rice noodles are round-section and long-strip-shaped rice products prepared from rice as a raw material through a series of work procedures of soaking, grinding, stirring, strip pressing and noodle discharging, drying and the like. The rice noodles are convenient to eat, smooth and delicious, can be matched with meat and vegetables, are suitable for all seasons, are one of the staple foods in Liangguang (Guangdong and Guangxi), and are very popular among consumers. In order to produce rice noodle products capable of being eaten by the diabetic patients, lipid substances and starch are complexed to form V-type crystals to prepare the resistant starch, and resistant rice noodle products are thus further prepared, i.e., an emulsifying agent is added into a rice flour raw material to complex through extrusion processing. However, at present, this method still has some problems: Firstly, due to the influence by cluster structures of the starch, the complexing rate is generally low, and an ideal effect cannot be achieved. Secondly, the thermal stability of VI-type crystals of a starch-lipid complex is poor, the VI-type crystals of starch products prepared by the method are unstable during high-temperature steaming and boiling, crystal form transformation may occur, and the expected slow digestion characteristic is lost.

SUMMARY

In order to solve the technical problems, the disclosure adds debranching enzymes and an emulsifying agent into rice starch to prepare and obtain resistant starch through one-step extrusion, and then, other food raw materials such as rice flour are compounded to form low glycemic index rice noodles through secondary extrusion. By using the characteristic that V-type crystals are formed by complexing the emulsifying agent and amylose, the disclosure adds the debranching enzymes and the emulsifying agent into a rice starch raw material for extrusion processing. The debranching enzymes added in a first-step extrusion processing process perform limited hydrolysis on starch to reduce starch branching and improve a content of the amylose. At the same time, the emulsifying agent and the highly straight-chain rice starch are complexed to generate a VI-type starch-lipid complex, and a complexing rate of the emulsifying agent and the highly straight-chain rice starch is obviously improved. Then, second-step extrusion processing is performed to realize transformation of the starch-lipid complex from VI-type crystals to VII-type crystals and extrusion forming. Thermal stability of the resistant starch is improved. Therefore, the low glycemic index rice noodles are prepared and obtained.

The disclosure is firstly directed to provide a preparation method of low glycemic index rice noodles. By adding debranching enzymes and an emulsifying agent into rice starch, resistant starch is prepared and obtained through first-step extrusion, and then, round strip-shaped low glycemic index rice noodle products are obtained through second-step extrusion.

In an implementation of the disclosure, the method includes the following steps:

(1) raw material preparation: sieving rice starch, and adding water for preparation for use;

(2) mixing and tempering: adding debranching enzymes and an emulsifying agent into a raw material obtained in step (1), and performing uniform mixing;

(3) first-step extrusion: conveying a mixed material obtained in step (2) into an extrusion machine to be extruded;

(4) drying and crushing: after an extruded product obtained in step (3) is dried, performing crushing and sieving to obtain resistant starch;

(5) second-step extrusion: adding other food raw materials into the resistant starch obtained in step (4), conveying the material into the extrusion machine to be extruded and processed, performing extrusion and noodle discharging through the extrusion machine, and performing cutting in a die head position to obtain strip-shaped rice noodle products; and (6) strip rubbing, shaping, air drying and packaging: performing strip rubbing treatment on rice noodle strips to avoid adhesion, and then performing air drying and packaging to obtain the low glycemic index rice noodles.

In an implementation of the disclosure, in step (1), the rice starch is sieved by a 100-mesh sieve, and water is added for preparation to reach a water content of 30%-40%.

In an implementation of the disclosure, in step (2), the debranching enzymes are pullulanase and isoamylase, the total addition amount of the debranching enzymes is 40-60 ASPU/g rice starch dry basis, and a consumption ratio of the pullulanase to the isoamylase is 1:(0.5-2).

In an implementation of the disclosure, in step (2), the emulsifying agent is glycerin monostearate, and the addition amount is 0.5%-1% (w/w) of the rice starch raw material.

In an implementation of the disclosure, in first-step extrusion in step (3), four section temperatures of the extrusion machine are respectively set to be ranges of 45-55° C., 55-65° C., 65-75° C., and 75-95° C., and a screw rod rotating speed is in a range of 80-110 rpm.

In an implementation of the disclosure, in step (4), an extruded product obtained in step (3) is crushed after being dried for 20-50 min at 70-90° C., and is sieved by the 100-mesh sieve to obtain the resistant starch.

In an implementation of the disclosure, the disclosure is characterized in that the other food raw materials include 60%-70% of rice flour, 1%-5% of salad oil, 0.1%-0.5% of citric acid, 0.1%-0.5% of table salt, and 0.1%-0.3% of a rice flour stiffener.

In an implementation of the disclosure, in second-step extrusion in step (5), four section temperatures of the extrusion machine are respectively set to be in ranges of 75-85° C., 85-95° C., 95-105° C., and 105-135° C., and a screw rod rotating speed is in a range of 80-110 rpm.

In an implementation of the disclosure, before extrusion of the first-step extrusion in step (3) and the second-step extrusion in step (5), the water content respectively needs to be regulated to 30%-40%.

In an implementation of the disclosure, the method includes the following steps:
(1) raw material preparation: sieving rice starch by a 100-mesh sieve, and adding water for preparation to reach a water content of 30%-40%;
(2) mixing and tempering: adding debranching enzymes and an emulsifying agent into a raw material obtained in step (1), and performing uniform mixing, wherein the debranching enzymes are pullulanase and isoamylase, the total addition amount of the debranching enzymes is 40-60 ASPU/g rice starch dry basis, a consumption ratio of the pullulanase to the isoamylase is 1:(0.5-2), the emulsifying agent is glycerin monostearate, and the addition amount is 0.5%-1% (w/w) of the rice starch raw material;
(3) first-step extrusion: conveying a mixed material obtained in step (2) into an extrusion machine to be extruded, and setting four section temperatures of the extrusion machine in the extrusion respectively to be in ranges of 45-55° C., 55-65° C., 65-75° C., and 75-95° C., and a screw rod rotating speed to be in a range of 80-110 rpm;
(4) drying and crushing: after an extruded product obtained in step (3) is dried for 20-50 min at 70-90° C., performing crushing and sieving by a 100-mesh sieve to obtain resistant starch;
(5) second-step extrusion: adding 60%-70% of rice flour, 1%-5% of salad oil, 0.1%-0.5% of citric acid, 0.1%-0.5% of table salt, and 0.1%-0.3% of a rice flour stiffener into the resistant starch obtained in step (4), conveying the material into the extrusion machine to be extruded and processed, performing extrusion and noodle discharging through the extrusion machine, and performing cutting in a die head position to obtain round strip-shaped rice noodle products, wherein four section temperatures of the extrusion machine in the extrusion are respectively set to be in ranges of 75-85° C., 85-95° C., 95-105° C., and 105-135° C., and a screw rod rotating speed is in a range of 80-110 rpm; and
(6) strip rubbing, shaping, air drying and packaging: performing strip rubbing treatment on rice noodle strips to avoid adhesion, and then performing air drying and packaging to obtain the low glycemic index rice noodles.

In an implementation of the disclosure, the method includes the following steps:
(1) sieving rice starch by a 100-mesh sieve, and adding water for preparation to reach a water content of 30%-35% for use;
(2) adding debranching enzymes and an emulsifying agent into a rice starch raw material, and performing uniform mixing, wherein the debranching enzymes are pullulanase and isoamylase, the addition amount is 40 ASPU/g rice starch dry basis, a consumption ratio of the pullulanase to the isoamylase is 1:1, the emulsifying agent is glycerin monostearate, and the total addition amount is 0.5% (w/w) of the rice starch raw material; and regulating a water content to be 30%-35%;
(3) conveying a mixed material into an extrusion machine, setting a solid material feeding speed to be 5 t/h before the extrusion is started, and setting four section temperatures of the extrusion machine respectively to be 45° C., 55° C., 65° C., and 75° C., a screw rod rotating speed to be 80 rpm, and a hole diameter of a die head of a discharging opening of the extrusion machine to be 8 mm;
(4) after an extruded product is dried by 80° C. hot air for 30 min, performing crushing and sieving by a 100-mesh sieve to obtain resistant starch;
(5) adding other food raw materials including 65% of rice flour, 1% of salad oil, 0.5% of citric acid, 0.2% of table salt, and 0.15% of a rice flour stiffener into the prepared and obtained resistant starch, conveying the material into the extrusion machine to be extruded and processed, setting a solid material feeding speed to be 5 t/h before extrusion is started, setting four section temperatures of the extrusion machine respectively to be 80° C., 90° C., 100° C. and 110° C., a screw rod rotating speed to be 110 rpm, a hole diameter of a die head of a discharging opening of the extrusion machine to be 1 mm, and a rotating speed of a cutting machine in a discharging opening position to be 250 rpm, performing extrusion and noodle discharging through the extrusion machine, and performing cutting in a die head position to obtain round strip-shaped products with a length of 50 cm; and
(6) performing strip rubbing treatment on rice noodle strips to avoid adhesion, and then performing air drying and packaging to obtain the low glycemic index rice noodles.

In an implementation of the disclosure, the method includes the following steps:
(1) sieving rice starch by a 100-mesh sieve, and adding water for preparation to reach a water content of 30%-35% for use;
(2) adding debranching enzymes and an emulsifying agent into a rice starch raw material, and performing uniform mixing, wherein the debranching enzymes are pullulanase and isoamylase, the addition amount is 45 ASPU/g rice starch dry basis, a consumption ratio of the pullulanase to the isoamylase is 1:1, the emulsifying agent is glycerin monostearate, and the total addition amount is 0.5% (w/w) of the rice starch raw material; and regulating a water content to be 30%-35%;
(3) conveying a mixed material into an extrusion machine, setting a solid material feeding speed to be 6 t/h before the extrusion is started, and setting four section temperatures of the extrusion machine respectively to be 50° C., 60° C., 70° C., and 80° C., a screw rod rotating speed to be 90 rpm, and a hole diameter of a die head of a discharging opening of the extrusion machine to be 8 mm;

(4) after an extruded product is dried by 80° C. hot air for 30 min, performing crushing and sieving by a 100-mesh sieve to obtain resistant starch;

(5) adding other food raw materials including 65% of rice flour, 1% of salad oil, 0.5% of citric acid, 0.2% of table salt, and 0.15% of a rice flour stiffener into the prepared and obtained resistant starch, conveying the material into the extrusion machine to be extruded and processed, setting a solid material feeding speed to be 5 t/h before extrusion is started, setting four section temperatures of the extrusion machine respectively to be 80° C., 90° C., 100° C. and 110° C., a screw rod rotating speed to be 110 rpm, a hole diameter of a die head of a discharging opening of the extrusion machine to be 1 mm, and a rotating speed of a cutting machine in a discharging opening position to be 250 rpm, performing extrusion and noodle discharging through the extrusion machine, and performing cutting in a die head position to obtain round strip-shaped products with a length of 50 cm; and (6) performing strip rubbing treatment on rice noodle strips to avoid adhesion, and then performing air drying and packaging to obtain the low glycemic index rice noodles.

In an implementation of the disclosure, the method includes the following steps:

(1) sieving rice starch by a 100-mesh sieve, and adding water for preparation to reach a water content of 30%-35% for use;

(2) adding debranching enzymes and an emulsifying agent into a rice starch raw material, and performing uniform mixing, wherein debranching enzymes are pullulanase and isoamylase, the addition amount is 50 ASPU/g rice starch dry basis, a consumption ratio of the pullulanase to the isoamylase is 1:1, the emulsifying agent is glycerin monostearate, and the total addition amount is 1% (w/w) of the rice starch raw material; and regulating a water content to be 30%-35%;

(3) conveying a mixed material into an extrusion machine, setting a solid material feeding speed to be 7 t/h before the extrusion is started, and setting four section temperatures of the extrusion machine respectively to be 55° C., 65° C., 75° C., and 85° C., a screw rod rotating speed to be 100 rpm, and a hole diameter of a die head of a discharging opening of the extrusion machine to be 8 mm;

(4) after an extruded product is dried by 80° C. hot air for 30 min, performing crushing and sieving by a 100-mesh sieve to obtain resistant starch;

(5) adding other food raw materials including 70% of rice flour, 1% of salad oil, 0.5% of citric acid, 0.2% of table salt, and 0.15% of a rice flour stiffener into the prepared and obtained resistant starch, conveying the material into the extrusion machine to be extruded and processed, setting a solid material feeding speed to be 6 t/h before extrusion is started, setting four section temperatures of the extrusion machine respectively to be 85° C., 95° C., 105° C. and 120° C., a screw rod rotating speed to be 110 rpm, a hole diameter of a die head of a discharging opening of the extrusion machine to be 1 mm, and a rotating speed of a cutting machine in a discharging opening position to be 250 rpm, performing extrusion and noodle discharging through the extrusion machine, and performing cutting in a die head position to obtain round strip-shaped products with a length of 50 cm; and (6) performing strip rubbing treatment on rice noodle strips to avoid adhesion, and then performing air drying and packaging to obtain the low glycemic index rice noodles.

In an implementation of the disclosure, the method includes the following steps:

(1) sieving rice starch by a 100-mesh sieve, and adding water for preparation to reach a water content of 30%-35% for use;

(2) adding debranching enzymes and an emulsifying agent into a rice starch raw material, and performing uniform mixing, wherein debranching enzymes are pullulanase and isoamylase, the addition amount is 60 ASPU/g rice starch dry basis, a consumption ratio of the pullulanase to the isoamylase is 1:1, the emulsifying agent is glycerin monostearate, and the total addition amount is 1% (w/w) of the rice starch raw material; and regulating a water content to be 30%-35%;

(3) conveying a mixed material into an extrusion machine, setting a solid material feeding speed to be 8 t/h before the extrusion is started, and setting four section temperatures of the extrusion machine respectively to be 55° C., 65° C., 75° C., and 85° C., a screw rod rotating speed to be 110 rpm, and a hole diameter of a die head of a discharging opening of the extrusion machine to be 8 mm;

(4) after an extruded product is dried by 80° C. hot air for 30 min, performing crushing and sieving by a 100-mesh sieve to obtain resistant starch;

(5) adding other food raw materials including 70% of rice flour, 1% of salad oil, 0.5% of citric acid, 0.2% of table salt, and 0.15% of a rice flour stiffener into the prepared and obtained resistant starch, conveying the material into the extrusion machine to be extruded and processed, setting a solid material feeding speed to be 7 t/h before extrusion is started, setting four section temperatures of the extrusion machine respectively to be 85° C., 95° C., 105° C. and 125° C., a screw rod rotating speed to be 110 rpm, a hole diameter of a die head of a discharging opening of the extrusion machine to be 1 mm, and a rotating speed of a cutting machine in a discharging opening position to be 250 rpm, performing extrusion and noodle discharging through the extrusion machine, and performing cutting in a die head position to obtain round strip-shaped products with a length of 50 cm; and (6) performing strip rubbing treatment on rice noodle strips to avoid adhesion, and then performing air drying and packaging to obtain the low glycemic index rice noodles.

The disclosure is secondly directed to provide rice noodles prepared and obtained by the above method.

The disclosure is thirdly directed to provide a preparation method of low glycemic index resistant starch. According to the method, the resistant starch is prepared and obtained by adding debranching enzymes and an emulsifying agent into rice starch through extrusion.

In an implementation of the disclosure, four section temperatures of an extrusion machine in the extrusion are respectively set to be in ranges of 45-55° C., 55-65° C., 65-75° C., and 75-95° C.

In an implementation of the disclosure, the debranching enzymes are pullulanase and isoamylase, the total addition amount of the debranching enzymes is 40-60 ASPU/g rice starch dry basis, and a consumption ratio of the pullulanase to the isoamylase is 1:(0.5-2).

In an implementation of the disclosure, the emulsifying agent is glycerin monostearate, and the addition amount is 0.5%-1% (w/w) of the rice starch.

The disclosure is fourthly directed to provide low glycemic index resistant starch prepared and obtained by the above method.

The disclosure has the beneficial effects:

(1) By using the characteristic that V-type crystals are formed by complexing the emulsifying agent and amylose, the disclosure adds the debranching enzymes and the emulsifying agent into the rice starch raw material for extrusion processing. In a first-step extrusion processing process, the emulsifying agent and the rice starch are complexed to generate a lipid-starch complex. At the same time, the added debranching enzymes perform limited hydrolysis on starch to reduce starch branching and improve the content of the amylose, so that the complexing rate of the emulsifying agent and starch is improved. In the first-step extrusion processing process, partial A-type starch crystals in unprocessed rice flour are promoted to be transformed into VI-type starch crystals, and the crystal form of the unprocessed rice flour is changed to obtain the resistant starch. The content of the resistant starch accounts for 50%-60% of the total content of the starch. After being compounded with other food raw materials, the resistant starch is subjected to secondary extrusion processing to obtain the low glycemic index rice noodles. Through the second-step extrusion processing, transformation of the starch-lipid complex from VI-type crystals to VII-type crystals and extrusion forming are realized. Two steps of extrusion support each other in aspects of increasing the content of the resistant starch in the rice noodles and simulating the blood glucose index in vitro. A certain cooperative effect is achieved. The thermal stability of the resistant starch is jointly improved. Therefore, the low glycemic index rice noodles with the characteristic of high thermal resistance are prepared and obtained. The glycemic index of the rice noodle product is below 55.

(2) The disclosure uses the rice starch and the rice flour as raw materials to prepare the low glycemic index rice noodles. Due to formation of the starch-lipid complex, starch crystals generate crystal form transformation. The digestion speed in vivo is lower than that of ordinary starch, so that the rice noodles prepared by the disclosure have a digestion-resistant characteristic.

(3) The method of the disclosure has a short production period, high production efficiency and low cost, and is easy to realize large-scale industrialized production.

BRIEF DESCRIPTION OF FIGURES

FIG. 1 is an X-ray diffraction diagram of the disclosure.

DETAILED DESCRIPTION

Exemplary Embodiments of the disclosure will be illustrated hereafter, and it should be understood that the Embodiment s are intended to better illustrate the disclosure and are not intended to limit the disclosure.

1. Determination of Resistant Starch Content (by an Englyst Method)

200 mg of a sample was weighed and placed into a 50 mL centrifuge tube. 2 mL of water was added. After uniform mixing, the mixture was placed into a 37° C. constant-temperature water bath for oscillation (a rotating speed was 160 rpm). 4 mL of a pepsin solution (containing 0.5 g of pepsin and 0.5 g of guar gum dispersed in 100 mL of a 5 mol/L hydrochloric acid solution) was added for reaction for 30 min. Then, 5 glass beads and 2 mL of a 0.5 mol/L sodium acetate solution (pH=5.2) were added into each test centrifuge tube for continuous oscillation for 30 min. Then, 2 mL of a mixed enzyme solution (8 g of pancreatin and 1.96 mL of glucoamylase (260 U/mL) were dispersed in 44.8 mL of water) was added. After hydrolysis for 0 and 120 min, 0.1 mL of the sample was taken, and 0.9 mL of 90% ethyl alcohol was added for enzyme deactivation. After 10000 g centrifugation for 5 min, supernatant was taken. Water not added with the sample was used as a blank sample. A glucose oxidase kit (GOD-POD) was used to determine a glucose content. Each sample was subjected to parallel determination for 3 times to take an average value. Resistant starch (RDS) was starch not being digested and absorbed by small intestines within 20 min. A specific formula was as follows: RDS=$(G_{20}-G_0) \times 0.9 \times 100\%$/TS In the formula, $G_0$ and $G_{120}$ were respectively glucose/mg released after enzymolysis for 0 and 20 min. TS was a sample total starch dry basis weight/mg.

2. Determination of In Vitro Simulated Blood Glucose Index (by a Goni Method)

200 mg of a sample was weighed and placed into a 50 mL centrifuge tube. 2 mL of water was added. After uniform mixing, the mixture was placed into a 37° C. constant-temperature water bath for oscillation (a rotating speed was 160 rpm). 4 mL of a pepsin solution (containing 0.5 g of pepsin and 0.5 g of guar gum dispersed in 100 mL of a 5 mol/L hydrochloric acid solution) was added for reaction for 30 min. Then, 5 glass beads and 2 mL of a 0.5 mol/L sodium acetate solution (pH=5.2) were added into each test centrifuge tube for continuous oscillation for 30 min. Then, 2 mL of a mixed enzyme solution (8 g of pancreatin and 1.96 mL of glucoamylase (260 U/mL) were dispersed in 44.8 mL of water) was added, and accurate timing was performed. After oscillation hydrolysis for 0, 30, 60, 90, 120 and 180 min, 0.1 mL of the sample was taken, and 0.9 mL of 90% ethyl alcohol was added for enzyme deactivation. After 10000 g centrifugation for 5 min, supernatant was taken. Water not added with the sample was used as a blank sample. A glucose oxidase kit (GOD-POD) was used to determine a glucose content. Each sample was subjected to parallel determination for 3 times to take an average value. A digestion rate of the sample is marked by a hydrolysis rate (%) of the sample at 0-180 min, and an area under a hydrolysis curve (AUC) is calculated by plotting.

Calculation formulas of a sample hydrolysis index (HI) and a blood glucose index are as follows:

$$HI = \frac{AUC(\text{sample})}{AUC(\text{reference})} \times 100\%, \text{ and } GI = 0.549 \times HI + 37.91.$$

3. Determination of Thermal Stability of Resistant Starch 100 mg of a sample was accurately weighed and taken. 2.5 mL of deionized water was added. Uniform oscillation was performed. A 100° C. boiling water bath was performed for 20 min. Then, its resistant starch content was determined according to steps of determining the resistant starch content. A thermal stability calculation formula is as follows:

Thermal stability of resistant starch $$(\%) = \frac{R_1}{R_0} \times 100\%$$

In the formula, $R_0$ and $R_1$ are respectively contents of resistant starch in the sample before and after the boiling water bath for 20 min.

4. X-Ray Diffraction Experiment

After dried sample powder was subjected to moisture balance in a drier containing a saturated potassium chloride solution for one week, a wide-angle X-ray diffractometer was adopted for determination. A cuprum target Cu-Kα (λ=0.15406 nm) was selected and used. The power was 1600 W (40 kV×40 mA). A NaI crystal scintillation counter was adopted for measurement. A scanning range was in a range of 3-40°. A scanning step length was 0.02°. A scanning speed was 3°/min.

Pullulanase and isoamylase in the Embodiment s below were purchased from Shanghai Ryon Biological Technology Co., Ltd.

Embodiment 1: Preparation of Low Glycemic Index Resistant Rice Noodles

Specific steps are as follows:
(1) Rice starch was sieved by a 100-mesh sieve, and water was added for preparation to reach a water content of 30%-35% for use.
(2) Debranching enzymes and an emulsifying agent were added into a rice starch raw material and were uniformly mixed. The debranching enzymes were pullulanase and isoamylase, the total addition amount was 40 ASPU/g rice starch dry basis, a consumption ratio of the pullulanase to the isoamylase was 1:1, the emulsifying agent was glycerin monostearate, and the total addition amount was 0.5% (w/w) of the rice starch raw material. The water content was regulated to 30%-35%.
(3) A mixed material was conveyed into an extrusion machine. A solid material feeding speed was 5 t/h before the extrusion was started. Four section temperatures of the extrusion machine were respectively set to be 45° C., 55° C., 65° C., and 75° C. A screw rod rotating speed was 80 rpm, and a hole diameter of a die head of a discharging opening of the extrusion machine was 8 mm.
(4) After an extruded product was dried by 80° C. hot air for 30 min, crushing and sieving by a 100-mesh sieve were performed to obtain resistant starch.
(5) Other food raw materials including 65% of rice flour, 1% of salad oil, 0.5% of citric acid, 0.2% of table salt, and 0.15% of a rice flour stiffener were added into the prepared and obtained resistant starch, and the mixed material was conveyed into the extrusion machine to be extruded and processed. A solid material feeding speed was 5 t/h before extrusion was started. Four section temperatures of the extrusion machine were respectively set to be 80° C., 90° C., 100° C. and 110° C. A screw rod rotating speed was 110 rpm. A hole diameter of a die head of a discharging opening of the extrusion machine was 1 mm, and a rotating speed of a cutting machine in a discharging opening position was 250 rpm. Extrusion and noodle discharging were performed through the extrusion machine, and cutting was performed in a die head position to obtain round strip-shaped products with a length of 50 cm.
(6) Strip rubbing treatment was performed on the rice noodle strips to avoid adhesion, and then air drying and packaging were performed to obtain the low glycemic index rice noodles.

Embodiment 2: Preparation of Low Glycemic Index Resistant Rice Noodles

Specific steps are as follows:
(1) Rice starch was sieved by a 100-mesh sieve, and water was added for preparation to reach a water content of 30%-35% for use.
(2) Debranching enzymes and an emulsifying agent were added into a rice starch raw material and were uniformly mixed. The debranching enzymes were pullulanase and isoamylase, the addition amount was 45 ASPU/g rice starch dry basis, a consumption ratio of the pullulanase to the isoamylase was 1:1, the emulsifying agent was glycerin monostearate, and the total addition amount was 0.5% (w/w) of the rice starch raw material. The water content was regulated to 30%-35%.
(3) A mixed material was conveyed into an extrusion machine. A solid material feeding speed was 6 t/h before the extrusion is started. Four section temperatures of the extrusion machine were respectively set to be 50° C., 60° C., 70° C., and 80° C. A screw rod rotating speed was 90 rpm, and a hole diameter of a die head of a discharging opening of the extrusion machine was 8 mm.
(4) After an extruded product was dried by 80° C. hot air for 30 min, crushing and sieving by a 100-mesh sieve were performed to obtain resistant starch.
(5) Other food raw materials including 65% of rice flour, 1% of salad oil, 0.5% of citric acid, 0.2% of table salt, and 0.15% of a rice flour stiffener were added into the prepared and obtained resistant starch, and the mixed material was conveyed into the extrusion machine to be extruded and processed. A solid material feeding speed was 5 t/h before extrusion was started. Four section temperatures of the extrusion machine were respectively set to be 80° C., 90° C., 100° C. and 110° C. A screw rod rotating speed was 110 rpm. A hole diameter of a die head of a discharging opening of the extrusion machine was 1 mm, and a rotating speed of a cutting machine in a discharging opening position was 250 rpm. Extrusion and noodle discharging were performed through the extrusion machine, and cutting was performed in a die head position to obtain round strip-shaped products with a length of 50 cm.
(6) Strip rubbing treatment was performed on the rice noodle strips to avoid adhesion, and then air drying and packaging were performed to obtain the low glycemic index rice noodles.

Embodiment 3: Preparation of Low Glycemic Index Resistant Rice Noodles

Specific steps are as follows:
(1) Rice starch was sieved by a 100-mesh sieve, and water was added for preparation to reach a water content of 30%-35% for use.

(2) Debranching enzymes and an emulsifying agent were added into a rice starch raw material and were uniformly mixed. The debranching enzymes were pullulanase and isoamylase, the addition amount was 50 ASPU/g rice starch dry basis, a consumption ratio of the pullulanase to the isoamylase was 1:1, the emulsifying agent was glycerin monostearate, and the total addition amount was 1% (w/w) of the rice starch raw material. The water content was regulated to 30%-35%.

(3) A mixed material was conveyed into an extrusion machine. A solid material feeding speed was 7 t/h before the extrusion is started. Four section temperatures of the extrusion machine were respectively set to be 55° C., 65° C., 75° C., and 85° C. A screw rod rotating speed was 100 rpm, and a hole diameter of a die head of a discharging opening of the extrusion machine was 8 mm.

(4) After an extruded product was dried by 80° C. hot air for 30 min, crushing and sieving by a 100-mesh sieve were performed to obtain resistant starch.

(5) Other food raw materials including 70% of rice flour, 1% of salad oil, 0.5% of citric acid, 0.2% of table salt, and 0.15% of a rice flour stiffener were added into the prepared and obtained resistant starch, and the mixed material was conveyed into the extrusion machine to be extruded and processed. A solid material feeding speed was 6 t/h before extrusion was started. Four section temperatures of the extrusion machine were respectively set to be 85° C., 95° C., 105° C. and 120° C. A screw rod rotating speed was 110 rpm. A hole diameter of a die head of a discharging opening of the extrusion machine was 1 mm, and a rotating speed of a cutting machine in a discharging opening position was 250 rpm. Extrusion and noodle discharging were performed through the extrusion machine, and cutting was performed in a die head position to obtain round strip-shaped products with a length of 50 cm.

(6) Strip rubbing treatment was performed on the rice noodle strips to avoid adhesion, and then air drying and packaging were performed to obtain the low glycemic index rice noodles.

Embodiment 4: Preparation of Low Glycemic Index Resistant Rice Noodles

Specific steps are as follows:

(1) Rice starch was sieved by a 100-mesh sieve, and water was added for preparation to reach a water content of 30%-35% for use.

(2) Debranching enzymes and an emulsifying agent were added into a rice starch raw material and were uniformly mixed. The debranching enzymes were pullulanase and isoamylase, the addition amount was 60 ASPU/g rice starch dry basis, a consumption ratio of the pullulanase to the isoamylase was 1:1, the emulsifying agent was glycerin monostearate, and the total addition amount was 1% (w/w) of the rice starch raw material. The water content was regulated to 30%-35%.

(3) A mixed material was conveyed into an extrusion machine. A solid material feeding speed was 8 t/h before the extrusion is started. Four section temperatures of the extrusion machine were respectively set to be 55° C., 65° C., 75° C., and 85° C. A screw rod rotating speed was 110 rpm, and a hole diameter of a die head of a discharging opening of the extrusion machine was 8 mm.

(4) After an extruded product was dried by 80° C. hot air for 30 min, crushing and sieving by a 100-mesh sieve were performed to obtain resistant starch.

(5) Other food raw materials including 70% of rice flour, 1% of salad oil, 0.5% of citric acid, 0.2% of table salt, and 0.15% of a rice flour stiffener were added into the prepared and obtained resistant starch, and the mixed material was conveyed into the extrusion machine to be extruded and processed. A solid material feeding speed was 7 t/h before extrusion was started. Four section temperatures of the extrusion machine were respectively set to be 85° C., 95° C., 105° C. and 125° C. A screw rod rotating speed was 110 rpm. A hole diameter of a die head of a discharging opening of the extrusion machine was 1 mm, and a rotating speed of a cutting machine in a discharging opening position was 250 rpm. Extrusion and noodle discharging were performed through the extrusion machine, and cutting was performed in a die head position to obtain round strip-shaped products with a length of 50 cm.

(6) Strip rubbing treatment was performed on the rice noodle strips to avoid adhesion, and then air drying and packaging were performed to obtain the low glycemic index rice noodles.

Comparative Example 1: Unprocessed Rice Starch

Unprocessed rice starch

Comparative Example 2: Omitting First-Step Extrusion in Step (3)

A first-step extrusion process in step (3) of Embodiment 4 was omitted. Other conditions or parameters were identical to those of Embodiment 4. Resistant starch was obtained. According to data in Table 1, it could be known that compared with Embodiment 4, the first-step extrusion step was omitted, a content of the resistant starch was reduced from 58.4% to 16.5%. This was because in the first-step extrusion step, a high-pressure environment was provided, reaction conditions of the debranching enzymes were reduced. At the same time, an enzyme reaction substrate concentration, i.e., a starch concentration was improved. This enabled a limited hydrolysis reaction of the debranching enzymes to efficiently perform in the extrusion process. A content of amylose was greatly increased, so that the complexing rate of the emulsifying agent and the starch was improved, i.e., the content of the resistant starch was increased. After the first-step extrusion was omitted, the limited hydrolysis reaction of the debranching enzymes could not be well performed, great reduction of the content of the resistant starch was directly caused. Therefore, the comparative example 2 showed that the first-step extrusion step had an effect of promoting parts of A-type starch crystals in the unprocessed rice flour to be transformed into VI-type starch crystals.

Comparative Example 3: Omitting Second-Step Extrusion in Step (5)

A second-step extrusion process in step (5) of Embodiment 4 was omitted. Other conditions or parameters were identical to those of Embodiment 4. Resistant starch was obtained. According to data in Table 1, it could be known that compared with Embodiment 4, the second-step extrusion step was omitted, a content of the resistant starch was reduced from 58.4% to 44.7%, and the blood glucose index was raised from 40.7 to 57.8. This was because starch-lipid complexes (resistant starch) formed in first-step extrusion were mostly VI-type crystals, and the VI-type crystals were unstable, and might generate crystal form transformation to lose an unexpected slow digestion characteristic. The second-step extrusion step had granulation shaping effects, and also had effects of promoting the VI-type starch crystals in the unprocessed rice flour to be transformed into VII-type starch crystals so as to improve the stability of the resistant starch and reduce the blood glucose index.

TABLE 1

Detection results of content of resistant starch and in vitro simulated blood glucose index

| Sample | Content of resistant starch (%) | In vitro simulated blood glucose index | Thermal stability performance |
|---|---|---|---|
| Embodiment 1 | 51.2 ± 0.3 | 50.3 ± 0.1 | 92.4 ± 0.5 |
| Embodiment 2 | 54.4 ± 0.6 | 46.2 ± 0.3 | 93.2 ± 0.3 |
| Embodiment 3 | 55.1 ± 0.2 | 45.4 ± 0.4 | 93.9 ± 0.6 |
| Embodiment 4 | 58.4 ± 0.5 | 40.7 ± 0.2 | 95.2 ± 0.2 |
| Comparative example 1 | 15.6 ± 0.6 | 85.3 ± 0.3 | 58.4 ± 0.3 |
| Comparative example 2 | 16.5 ± 0.3 | 79.4 ± 0.2 | 75.2 ± 0.1 |
| Comparative example 3 | 44.7 ± 0.1 | 57.8 ± 0.6 | 76.0 ± 0.4 |
| Comparative example 4 | 20.3 ± 0.5 | 74.6 ± 0.1 | 90.8 ± 0.5 |

From FIG. 1, it can be seen that an unprocessed rice flour sample had strong diffraction peaks at 15.2°, 17.0°, 18.2° and 23.6°. The diffraction peaks belonged to typical A-type starch crystal diffraction peaks. After first-step extrusion, the original diffraction peak positions were not changed, the intensities of the diffraction peaks in positions of 15.2°, 17.0°, 18.2° and 23.6° were reduced. At the same time, new diffraction peaks appeared in positions of 7.5°, 13.0° and 20.0°, and belonged to typical V-type starch crystal diffraction peaks. It showed that after the first-step extrusion, parts of A-type starch crystals in unprocessed rice flour were transformed into VI-type starch crystals, and the crystal form of the unprocessed rice flour was changed. After the second-step extrusion, the positions of the diffraction peaks were not obviously changed from those after the first-step extrusion, but the half-peak width was increased, and it showed the VII-type starch crystal characteristic.

It can be known from Table 1 that the content of the resistant starch in the rice noodles obtained in Comparative example 2 by omitting the first-step extrusion processing was increased by 0.9% through being compared with that of Comparative example 1 (blank group), and the in vitro simulated blood glucose index was reduced by 5.9 through being compared with that in Reference document 1. The content of the resistant starch in the rice noodles obtained in Comparative example 3 by omitting the second-step extrusion processing was increased by 29.1% through being compared with that of Comparative example 1 (blank group), and the in vitro simulated blood glucose index was reduced by 27.5 through being compared with that in Reference document 1. The content of the resistant starch in the rice noodles obtained in Embodiment 1 by adopting a two-step extrusion method for combined treatment was improved by 35.6% through being compared with that of Comparative example 1 (blank group), and was more excellent than the sum (30%) of the single first-step extrusion and the second-step extrusion. The in vitro simulated blood glucose index was reduced by 35 through being compared with that in Reference document 1, and was more excellent than the sum (33.5) of the single first-step extrusion and second-step extrusion. It showed that the two-step extrusion method achieved mutual supporting and mutual supplementation in an aspect of increasing the content of the resistant starch and the in vitro simulated blood glucose index of the rice noodles.

The content of the resistant starch prepared after the debranching enzymes and the emulsifying agent were added for extrusion processing was in a range of 50%-60%, and was greatly improved through being compared with that of raw material rice flour. The in vitro simulated blood glucose index of the rice noodles prepared and obtained by compounding the obtained resistant starch with other food raw materials such as rice flour through extrusion processing was lower than 55, so that the disclosure can be used to prepare rice noodles for patients with type II diabetes to eat.

Comparative Example 4: Changing First-Step Extrusion Temperature

The first-step extrusion temperature in Embodiment 4 was regulated to 95° C., 105° C., 115° C. and 125° C., other parameter conditions were identical to those of Embodiment 4, and resistant starch was obtained. According to data in Table 1, it could be known that after the first-step extrusion temperature was regulated, the content of the resistant starch was reduced from 58.4% to 20.3%, and the blood glucose index was raised from 40.7 to 74.6 through being compared with those of Embodiment 4. This was because both an optimum temperature of the pullulanase and an optimum temperature of the isoamylase were below 100° C., at the regulated extrusion temperature, enzyme activities of the pullulanase and the isoamylase in the extrusion process were greatly reduced or even were lost, causing that the limited hydrolysis reaction rate of the starch was greatly decelerated, or the reaction could not be even performed finally. Therefore, the content of the resistant starch in products was greatly reduced.

What is claimed is:

1. A preparation method of low glycemic index rice noodles, comprising the following steps:
   (a) raw material preparation: sieving rice starch by a 100-mesh sieve, and adding water for preparation to reach a water content of 30%-40%;
   (b) mixing and tempering: adding debranching enzymes and an emulsifying agent into a raw material obtained in step (a), and performing uniform mixing, wherein the debranching enzymes are pullulanase and isoamylase, a total addition amount of the debranching enzymes is 40-60 ASPU/g rice starch dry basis, a consumption ratio of the pullulanase to the isoamylase is 1:(0.5-2), the emulsifying agent is glycerin monostearate, and an addition amount of the emulsifying agent is 0.5%-1% (w/w) of the rice starch raw material;
   (c) first-step extrusion: conveying a mixed material obtained in step (b) into an extrusion machine to be extruded, setting four section temperatures of the extrusion machine in the extrusion to be in ranges of 45-55° C., 55-65° C., 65-75° C., and 75-95° C., respectively, and setting a screw rod rotating speed to be in a range of 80-110 rpm;
   (d) drying and crushing: after an extruded product obtained in step (c) is dried for 20-50 min at 70-90° C., performing crushing and sieving by a 100-mesh sieve to obtain resistant starch;

(e) second-step extrusion: adding 60%-70% of rice flour, 1%-5% of salad oil, 0.1%-0.5% of citric acid, and 0.1%-0.5% of table salt into the resistant starch obtained in step (d), conveying the material into the extrusion machine to be extruded, performing extrusion and noodle discharging through the extrusion machine, and performing cutting in a die head position to obtain strip-shaped rice noodle products, wherein four section temperatures of the extrusion machine in the extrusion are set to be in ranges of 75-85° C., 85-95° C., 95-105° C., and 105-135° C., respectively, and a screw rod rotating speed is set to be in a range of 80-110 rpm; and (f) strip rubbing, shaping air drying and packaging: performing a strip rubbing treatment on rice noodle strips to avoid adhesion, and then performing air drying and packaging to obtain the low glycemic index rice noodles.

2. A method of preparation of low glycemic index rice noodles, comprising:
adding debranching enzymes and an emulsifying agent into rice starch;
preparing resistant starch through one-step extrusion; and
forming the low glycemic index rice noodles through second-step extrusion;
wherein the method further comprises:
(i) raw material preparation: sieving rice starch, and adding water for preparation;
(ii) mixing and tempering: adding debranching enzymes and an emulsifying agent into a raw material obtained in step (i), and performing uniform mixing;
(iii) first-step extrusion: conveying a mixed material obtained in step (ii) into an extrusion machine to be extruded;
(iv) drying and crushing: after an extruded product obtained in step (iii) is dried, performing crushing and sieving to obtain resistant starch;
(v) second-step extrusion: adding other food raw materials into the resistant starch obtained in step (iv), conveying the material into the extrusion machine to be extruded, performing extrusion forming through the extrusion machine, and performing cutting in a die head position to obtain strip-shaped rice noodle products; and
(vi) strip rubbing, shaping air drying and packaging: performing a strip rubbing treatment on rice noodle strips to avoid adhesion, and then performing air drying and packaging to obtain the low glycemic index rice noodles.

3. The method according to claim 2, wherein in the step (i), the rice starch is sieved by a 100-mesh sieve, and the water is added for preparation to reach a water content of 30%-40%.

4. The method according to claim 2, wherein the debranching enzymes comprise pullulanase and isoamylase, a total addition amount of the debranching enzymes is 40-60 ASPU/g rice starch dry basis, the emulsifying agent is glycerin monostearate, and an addition amount of the emulsifying agent is 0.5%-1% (w/w) of the rice starch raw material.

5. The method according to claim 2, wherein in the first-step extrusion, four section temperatures of the extrusion machine are respectively set to be in ranges of 45-55° C., 55-65° C., 65-75° C., and 75-95° C., and a screw rod rotating speed is in a range of 80-110 rpm.

6. The method according to claim 2, wherein in the step (iv), an extruded product obtained in step (iii) is crushed after being dried for 20-50 min at 70-90° C., and is sieved by the 100-mesh sieve to obtain the resistant starch.

7. The method according to claim 2, wherein the other food raw materials comprise 60%-70% of rice flour, 1%-5% of salad oil, 0.1%-0.5% of citric acid, and 0.1%-0.5% of table salt.

8. The method according to claim 2, wherein in the second-step extrusion, four section temperatures of the extrusion machine are set to be in ranges of 75-85° C., 85-95° C., 95-105° C., and 105-135° C., respectively, and a screw rod rotating speed is in a range of 80-110 rpm.

9. The method according to claim 2, wherein before extrusion of the first-step extrusion and the second-step extrusion, the water content is to be regulated to 30%-40%.

10. The method according to claim 2, wherein:
the raw material preparation comprises sieving rice starch by a 100-mesh sieve, and adding water for preparation to reach a water content of 30%-35% for use;
the mixing and tempering comprises adding debranching enzymes and an emulsifying agent into a rice starch raw material, and performing uniform mixing, wherein the debranching enzymes are pullulanase and isoamylase, a total addition amount of the debranching enzymes is 40 ASPU/g rice starch dry basis, a consumption ratio of the pullulanase to the isoamylase is 1:1, the emulsifying agent is glycerin monostearate, and an addition amount of the emulsifying agent is 0.5% of the rice starch raw material; and regulating a water content to be 30%-35%;
the first-step extrusion comprises conveying a mixed material into an extrusion machine, setting a solid material feeding speed to be 5 t/h before the extrusion is started, setting four section temperatures of the extrusion machine to be 45° C., 55° C., 65° C., and 75° C., respectively, setting a screw rod rotating speed to be 80 rpm, and setting a hole diameter of a die head of a discharging opening of the extrusion machine to be 8 mm;
the drying and crushing comprises, after an extruded product is dried by 80° C. hot air for 30 min, performing crushing and sieving by a 100-mesh sieve to obtain resistant starch;
the second-step extrusion comprises adding other food raw materials comprising 65% of rice flour, 1% of salad oil, 0.5% of citric acid, and 0.2% of table salt into the prepared and obtained resistant starch, conveying the material into the extrusion machine to be extruded, setting a solid material feeding speed to be 5 t/h before extrusion is started, setting four section temperatures of the extrusion machine respectively to be 80° C., 90° C., 100° C. and 110° C., a screw rod rotating speed to be 110 rpm, setting a hole diameter of a die head of a discharging opening of the extrusion machine to be 1 mm, setting a rotating speed of a cutting machine in a discharging opening position to be 250 rpm, performing extrusion and noodle discharging through the extrusion machine, and performing cutting in a die head position to obtain round strip-shaped products with a length of 50 cm; and
the strip rubbing, shaping air drying and packaging comprises performing a strip rubbing treatment on rice noodle strips to avoid adhesion, and then performing air drying and packaging to obtain the low glycemic index rice noodles.

11. The method according to claim 2, wherein:

the raw material preparation comprises sieving rice starch by a 100-mesh sieve, and adding water for preparation to reach a water content of 30%-35% for use;

the mixing and tempering comprises adding debranching enzymes and an emulsifying agent into a rice starch raw material, and performing uniform mixing, wherein the debranching enzymes are pullulanase and isoamylase, a total amount of the debranching enzymes is 45 ASPU/g rice starch dry basis, a consumption ratio of the pullulanase to the isoamylase is 1:1, the emulsifying agent is glycerin monostearate, and an addition amount of the emulsifying agent is 0.5% of the rice starch raw material; and regulating a water content to be 30%-35%;

the first-step extrusion comprises conveying a mixed material into an extrusion machine, setting a solid material feeding speed to be 6 t/h before the extrusion is started, setting four section temperatures of the extrusion machine respectively to be 50° C., 60° C., 70° C., and 80° C., setting a screw rod rotating speed to be 90 rpm, and setting a hole diameter of a die head of a discharging opening of the extrusion machine to be 8 mm;

the drying and crushing comprises, after an extruded product is dried by 80° C. hot air for 30 min, performing crushing and sieving by the 100-mesh sieve to obtain resistant starch;

the second-step extrusion comprises adding other food raw materials comprising 65% of rice flour, 1% of salad oil, 0.5% of citric acid, and 0.2% of table salt into the prepared and obtained resistant starch, conveying the material into the extrusion machine to be extruded, setting a solid material feeding speed to be 5 t/h before extrusion is started, setting four section temperatures of the extrusion machine respectively to be 80° C., 90° C., 100° C. and 110° C., a screw rod rotating speed to be 110 rpm, setting a hole diameter of a die head of a discharging opening of the extrusion machine to be 1 mm, setting a rotating speed of a cutting machine in a discharging opening position to be 250 rpm, performing extrusion and noodle discharging through the extrusion machine, and performing cutting in a die head position to obtain strip-shaped products with a length of 50 cm; and the strip rubbing, shaping air drying and packaging comprises performing a strip rubbing treatment on rice noodle strips to avoid adhesion, and then performing air drying and packaging to obtain the low glycemic index rice noodles.

12. The method according to claim 2, wherein:

the raw material preparation comprises sieving rice starch by a 100-mesh sieve, and adding water for preparation to reach a water content of 30%-35% for use;

the mixing and tempering comprises adding debranching enzymes and an emulsifying agent into a rice starch raw material, and performing uniform mixing, wherein debranching enzymes are pullulanase and isoamylase, a total addition amount of the debranching enzymes is 50 ASPU/g rice starch dry basis, a consumption ratio of the pullulanase to the isoamylase is 1:1, the emulsifying agent is glycerin monostearate, and an addition amount of the emulsifying agent is 1% of the rice starch raw material; and regulating a water content to be 30%-35%;

the first-step extrusion comprises conveying a mixed material into an extrusion machine, setting a solid material feeding speed to be 7 t/h before the extrusion is started, setting four section temperatures of the extrusion machine respectively to be 55° C., 65° C., 75° C., and 85° C., respectively, setting a screw rod rotating speed to be 100 rpm, and setting a hole diameter of a die head of a discharging opening of the extrusion machine to be 8 mm;

the drying and crushing comprises, after an extruded product is dried by 80° C. hot air for 30 min, performing crushing and sieving by a 100-mesh sieve to obtain resistant starch;

the second-step extrusion comprises adding other food raw materials comprising 70% of rice flour, 1% of salad oil, 0.5% of citric acid, and 0.2% of table salt into the obtained resistant starch, conveying the material into the extrusion machine to be extruded, setting a solid material feeding speed to be 6 t/h before extrusion is started, setting four section temperatures of the extrusion machine respectively to be 85° C., 95° C., 105° C. and 120° C., a screw rod rotating speed to be 110 rpm, setting a hole diameter of a die head of a discharging opening of the extrusion machine to be 1 mm, setting a rotating speed of a cutting machine in a discharging opening position to be 250 rpm, performing extrusion and noodle discharging through the extrusion machine, and performing cutting in a die head position to obtain round strip-shaped products with a length of 50 cm; and the strip rubbing, shaping air drying and packaging comprises performing a strip rubbing treatment on rice noodle strips to avoid adhesion, and then performing air drying and packaging to obtain the low glycemic index rice noodles.

13. The method according to claim 2, wherein:

the raw material preparation comprises sieving rice starch by a 100-mesh sieve, and adding water for preparation to reach a water content of 30%-35% for use;

the mixing and tempering comprises adding debranching enzymes and an emulsifying agent into a rice starch raw material, and performing uniform mixing, wherein the debranching enzymes are pullulanase and isoamylase, a total addition amount of the debranching enzymes is 60 ASPU/g rice starch dry basis, a consumption ratio of the pullulanase to the isoamylase is 1:1, the emulsifying agent is glycerin monostearate, and an addition amount of the emulsifying agent is 1% (w/w) of the rice starch raw material; and regulating a water content to be 30%-35%;

the first-step extrusion comprises conveying a mixed material into an extrusion machine, setting a solid material feeding speed to be 8 t/h before the extrusion is started, setting four section temperatures of the extrusion machine to be 55° C., 65° C., 75° C., and 85° C., respectively, setting a screw rod rotating speed to be 110 rpm, and setting a hole diameter of a die head of a discharging opening of the extrusion machine to be 8 mm;

the drying and crushing comprises, after an extruded product is dried by 80° C. hot air for 30 min, performing crushing and sieving by a 100-mesh sieve to obtain resistant starch;

the second-step extrusion comprises adding other food raw materials comprising 70% of rice flour, 1% of salad oil, 0.5% of citric acid, and 0.2% of table salt into the prepared and obtained resistant starch, conveying the material into the extrusion machine to be extruded and processed, setting a solid material feeding speed to be 7 t/h before extrusion is started, setting four section temperatures of the extrusion machine respectively to be 85° C., 95° C., 105° C. and 125° C., a screw rod rotating speed to be 110 rpm, setting a hole diameter of a die head of a discharging opening of the extrusion machine to be 1 mm, setting a rotating speed of a cutting machine in a discharging opening position to be 250 rpm, performing extrusion and noodle discharging through the extrusion machine, and performing cutting in a die head position to obtain strip-shaped products with a length of 50 cm; and the strip rubbing, shaping air drying and packaging comprises performing a strip rubbing treatment on rice noodle strips to avoid adhesion, and then performing air drying and packaging to obtain the low glycemic index rice noodles.

\* \* \* \* \*